(12) United States Patent
Du Plessis et al.

(10) Patent No.: US 7,563,304 B2
(45) Date of Patent: Jul. 21, 2009

(54) HEAP BIOLEACHING PROCESS

(75) Inventors: Chris Andre Du Plessis, Randburg (ZA); Sanet H. De Kock, Randburg (ZA)

(73) Assignee: BHP Billiton SA Limited (ZA)

( * ) Notice: Subject to any disclaimer, the term of this patent is extended or adjusted under 35 U.S.C. 154(b) by 258 days.

(21) Appl. No.: 11/496,117

(22) Filed: Jul. 31, 2006

(65) Prior Publication Data

US 2008/0178706 A1 Jul. 31, 2008

(51) Int. Cl.
*C22B 3/16* (2006.01)
(52) U.S. Cl. .......................... 75/721; 75/743
(58) Field of Classification Search ............ 75/721, 75/743
See application file for complete search history.

(56) References Cited

U.S. PATENT DOCUMENTS

| | | | |
|---|---|---|---|
| 5,710,361 A * | 1/1998 | Harrington et al. | 588/256 |
| 2002/0194962 A1* | 12/2002 | Kohr et al. | 75/743 |
| 2005/0211019 A1* | 9/2005 | Crundwell et al. | 75/375 |

FOREIGN PATENT DOCUMENTS

WO WO 02/29124 4/2002

OTHER PUBLICATIONS

Dixon, D.G., "Analysis of heat conservation during copper sulphide heap leaching" Hydrometallurgy, Elsevier Scientific Publishing CY., Amsterdam, NL, vol. 58, No. 1, Nov. 2000, pp. 27-41, XP 004212400; ISSN: 0304-386X; pp. 27, 28 and 41.

Ritchie, A.I.M., "Optimization of Biooxidation Heaps", Biomining: Theory, Microbes and Industrial Processes, 1997, pp. 200-226, XP 009023453; Figure 10.9, p. 223.

Rawlings, D. E. et al., "Biomineralization of metal-containing ores and concentrates" Trends in Biotechnology, Elsevier Publications, Cambridge, Great Britain, vol. 21, No. 1, Jan. 2003, pp. 38-44, XP004397635; ISSN: 0167-7799; p. 38, right column; pp. 43-44.

Tzeferis, P.G., "Use of Malosses in Heterotrophic Laterite Leaching", Erzmetall, GMBD—Medienverlag, Clausthal-Zellerfeld, DE, vol. 48, No. 10, Oct. 1, 1995, pp. 726-738, XP000535359; ISSN: 0044-2658 the whole document.

* cited by examiner

*Primary Examiner*—George Wyszomierski
*Assistant Examiner*—Tima M McGuthry-Banks
(74) *Attorney, Agent, or Firm*—Brinks Hofer Gilson & Lione; G. Peter Nichols

(57) ABSTRACT

A heap bioleaching process wherein carbon, in the form of a carbonate, carbon dioxide or organic carbon, is added to the heap when the temperature in the heap is in the range of 45° C. to 60° C. to increase microbial activity and thereby raise the heap temperature to about 60° C.

29 Claims, 3 Drawing Sheets

HEAP BIOLEACHING PROCESS

This application claims priority to PCT/ZA2005/000004 published in English on Aug. 11, 2005 as PCT WO 2005/073414 and to South African Patent Application No. 2004/0466 filed Jan. 30, 2004; the entire contents of each are incorporated herein by reference.

BACKGROUND OF THE INVENTION

This invention relates generally to a heap bioleaching process for the recovery of one or more metals from an ore.

The invention is described hereinafter with particular reference to the recovery of copper from a low grade marginal ore (eg. less than 0.7% copper) containing refractory primary sulphide minerals such as chalcopyrite. This however is only by way of example and the principles of the invention can be used in other appropriate circumstances for the recovery of different metals from different ores.

The heap bioleaching of copper is a microbial (bacterial and archaeal) mediated leaching process wherein:

the microorganisms oxidise ferrous iron to ferric iron;

the ferric iron facilitates an initial attack on the sulphide while sulphur oxidising microorganisms further oxidise the reduced sulphur species to sulphate;

the microbial oxidation of such sulphur species results in the release of heat;

the heat generated has important implications for the subsequent leaching process, particularly for primary copper minerals such as chalcopyrite which do not leach well at low temperatures (below 45° C.) and which require higher temperatures of up to 65° C. in order to achieve a satisfactory leaching rate; and acid is generated which is important for the leaching process and for maintaining the copper in solution.

In order to achieve elevated heap temperatures conducive to chalcopyrite heap leaching sequential populations of bioleaching microorganisms are required. This is necessary because microorganisms which predominate at ambient temperature, at heap start up, are not able to grow and contribute to the bioleaching process at elevated temperatures. For example microbial strains with a temperature optimum of 35° C. would have a relatively low activity at 45° C. and above while strains with a temperature optimum at 65° C. would have a relatively low activity at 45° C.

As is known in the art oxygen and carbon dioxide are supplied in the form of air to a heap. The oxygen is required for microbiological and chemical oxidation reactions while the carbon dioxide is required as a carbon source for the microorganisms.

The use of sequential microbial populations with increasing temperature optima is required to raise the temperature of the heap from ambient to a value at which chalcopyrite leaching can take place. The temperature increase results from heat which is generated by the bacteria and archaea oxidising sulphur.

It is known to assess bioleaching activity within a heap by monitoring the conversion rate of ferrous iron to ferric iron, in addition to the copper recovery. An indication of the rate of ferrous oxidation can relatively easily be obtained from the pregnant liquor solution which drains from the heap, either by measuring the ratio of ferrous iron to ferric iron in solution or by monitoring the redox potential, which is a function of the ferrous to ferric ratio.

SUMMARY OF INVENTION

The invention provides a method of operating a microbial mediated ore heap leaching process which includes the step of changing at least one operating parameter to raise the temperature in the heap when carbon supply becomes limiting to microbial activity, and thus heat generation by sulphur oxidation, in the heap.

The operating parameter or parameters may be changed by adding carbon in any suitable form to the heap. The carbon may for example be added as carbon dioxide eg. by enriching the carbon dioxide content in a stream of air supplied to the heap. The carbon may alternatively or additionally be provided in the form of carbonate-containing minerals which are added to the heap, or in the form of low cost organic carbon, such as molasses, a yeast extract or the like.

Alternatively, or additionally, the operating parameter is changed by adding heat to the heap. This may be done in any suitable way, for example by heating an irrigation solution which is supplied to the heap; by heating air which is supplied to the heap; by solar heating the heap; by applying thermal insulation to the heap to reduce heat losses, or the like.

In order to heat the heap it is also possible to make use of any of the techniques described in the specification of International patent application No. PCT/ZA2001/00154 (U.S. Pat. No. 6,884,280), the entire content of this specification (and patent) is hereby incorporated by reference in this specification.

The method may include the step of monitoring the heap to detect reduced microbial activity and, once such detection takes place, of initiating the change in the operating parameter.

Carbon limitation can be monitored by comparing inflow vs outflow carbon dioxide concentrations. Such monitoring could be conducted in conjunction with heat evolution monitoring of the heap, as this will confirm growth limitations. If the carbon dioxide is limiting then carbon addition will be beneficial for microbial growth and for heat generation.

In the 45° C. to 60° C. range, the carbon dioxide measurement is not all that meaningful as the microbes do not fix carbon dioxide very efficiently, and because a significant portion of the carbon requirements provided at this temperature could be provided by carbon compounds released from the decaying bacteria that had accumulated in prior lower temperature growth ranges. In this temperature range, microbial growth limitation would be more accurately detected by monitoring heat evolution in the heap. This can be done in any suitable way and for example use may be made of the heap leaching simulation column described in the specification of International patent application No. PCT/ZA2004/000025 (US 2005/0136527) the entire content of these applications are hereby incorporated in this specification.

Once the rate of heat generation stops decreasing in the 45° C. to 60° C. range it would be an indication to supplement the moderate thermophile microbes with the addition of organic carbon e.g. in the form of a yeast extract, as organic carbon has been shown to be more effective in stimulating growth of these microbes than carbon dioxide.

Thus the operation of the heap may be simulated under laboratory conditions to determine the circumstances in which reduced microbial activity becomes evident and this information is then used in the method of the invention to determine the point at which the operating parameter is changed.

Alternatively the step of changing the operating parameter may be initiated at a particular or predetermined temperature, for example 45° C., which is known to be a temperature beyond which the rate of heat generation, due to microbial activity, decreases to an unacceptable level.

BRIEF DESCRIPTION OF THE DRAWINGS

The invention is further described by way of example with reference to the accompanying drawings in which.

DESCRIPTION OF PREFERRED EMBODIMENT

Figure 1:
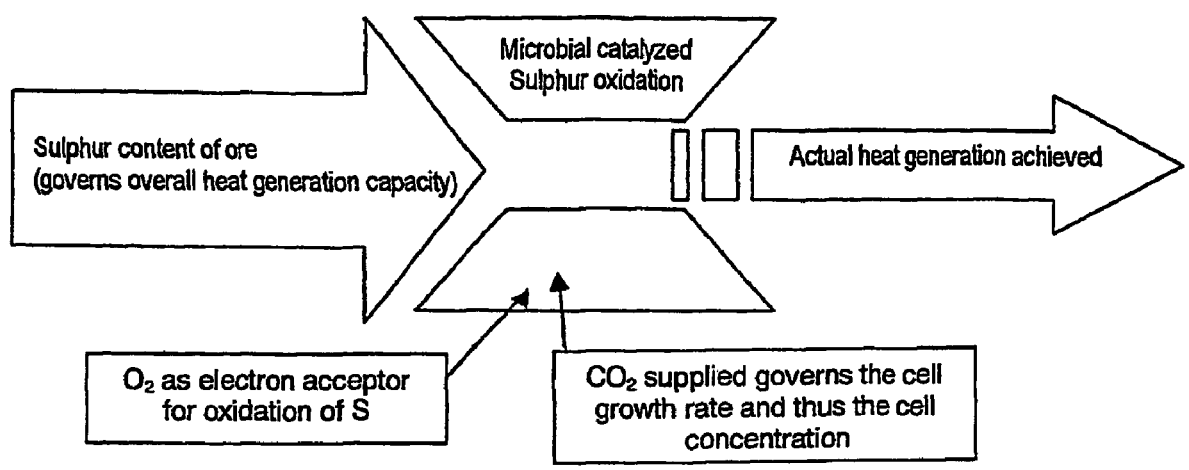
FIG. 1 graphically depicts the process of heat generation arising from the oxidation of reduced sulphur species.

The invention is based on the realisation, revealed as a result of laboratory tests, that the $CO_2:O_2$ ratio in which these two compounds are consumed in a heap is approximately 10 times greater than the rate in which these compounds are present in air, thus making carbon dioxide, and not oxygen, the most limiting factor for microbial growth rate (in the absence of other limitations) and hence for heat generation.

A further factor is that the effects of microbial activity in a heap, namely the oxidation of ferrous iron and the oxidation of sulphur, do not take place in a fixed relationship to each other. Thus a satisfactory rate of microbial ferrous iron oxidation does not imply that the accompanying microbial sulphur oxidation rate will also be satisfactory. Although these processes are related and are often performed simultaneously by the same microorganisms the relative rates of these reactions, and the extent to which they are affected under conditions of sub-optimal microbial activity, are not fixed at a constant ratio.

There are a number of reasons why sulphur oxidation rates, contrary to the practice referred to in the preamble hereof, cannot be inferred from ferrous iron oxidation rates. These reasons include the following:

(a) the microbial energetics related to these compounds are different, i.e. more energy is derived from the oxidation of reduced sulphur species than from ferrous iron;

(b) different enzymes are involved;

(c) some microbial strains only have ferrous oxidation capability while others only have sulphur oxidation capability;

(d) the active strains and enzymes responsible for the oxidation processes often have different kinetic responses to the prevailing environmental conditions; and (e) ferrous iron is more mobile in the heap leaching context than reduced sulphur species, thus increasing the probability of microbial oxidation of the former.

Also, while most of the iron in the solution contacting the ore is in the ferric state, rather than in the ferrous state, the impact of microbial activity is almost entirely on the sulphur oxidation phenomenon (and thus heat generation) with its subsequent effect on copper leaching kinetics. The detection and elucidation of this effect is not readily accomplished.

Another factor is that the ferrous oxidation rate seems to be less sensitive to microbial upset conditions than does the sulphur oxidation rate, thus making monitoring of the ferrous/ferric ratio (or redox potential) a poor predictor of sulphur oxidation.

During a bioleaching process the microbial population, initially inoculated into the heap, multiplies due to microbial growth. As the microbial concentration increases the demand for carbon dioxide, as a carbon source, is also increased. Data obtained by monitoring carbon dioxide and oxygen consumption rates in a heap leaching simulation column of the type described in the specification of South African patent application No. 2003/9936, and inoculated at a total cell concentration of $3 \times 10^{10}$ cells $ton^{-1}$, show that carbon dioxide consumption rates could reach values of 0.15 grams $CO_2$ $h^{-1}$, $ton^{-1}$ with oxygen consumption rates of 8.1 grams $O_2$ $h^{-1}$ $ton^{-1}$ (at a gas flow rate of 0.23 $Nm^3$ $h^{-1}$ $ton^{-1}$) within a period of 100 days using a 12 mm diameter ore particle size with a pyrite content of 3% (w/w) and a total copper content of 0.6% (w/w) of which 50% of the copper was present as either chalcocite or covellite and the remaining 50% as chalcopyrite. The ratio of the mass of carbon dioxide consumed by the microorganisms to the mass of oxygen consumed by the microorganisms is approximately 0.0185. The carbon dioxide supplied to the leaching process via the air supply system was virtually 100% consumed while only approximately 20% of the oxygen was consumed. From this observation and the fact that the ratio of the mass of carbon dioxide to the mass of oxygen in air is about 0.0022, it is clear that the availability of carbon dioxide is likely to become limiting to microbial growth before the availability of oxygen becomes limiting.

Optimal microbial growth rates, and associated heat generation from sulphur oxidation, may not be achievable when using typical heap air flow rates of 0.02-0.08 $Nm^3$ $h^{-1}$ $ton^{-1}$. Air flow rates are usually capped in this range (being dependent, amongst other factors, upon the sulphide content of the ore) because of the need to conserve and maintain the heat inside the heap, i.e. a high air flow rate will tend to cool the heap and therefore the air flow rate must be limited to maintain the heat inside the heap. This restriction on the air flow rate in order to conserve heat, however, also limits the rate of carbon dioxide delivery to sulphur oxidizing microorganisms thus preventing their optimal growth and, consequently, limiting their heat generation capacity. In addition, the restricted air flow rate will result in a non-uniform distribution of microbial growth in a heap which is leached, with most of the carbon consumed (and thus microbial growth and heat generation) occurring mainly at the bottom of the heap while the rest of the heap is virtually deprived of carbon dioxide and thus microbial growth. The control of air flow rate thus has two conflicting outcomes in terms of heat generation (via microbial action) and heat maintenance.

Current techniques for calculating air flow requirements in heaps are based on the stoichiometric requirement of oxygen for the oxidation of available sulphur to sulphate and ferrous to ferric, as well as the oxidation of other reduced compounds to their oxidized equivalent. It is believed that such a stoichiometric-based rationale is erroneous because it assumes that the process is driven by the availability of oxygen and reduced (oxidizable) species and assumes that the microbes that have to catalyse the oxidation reactions are present in sufficient cell numbers and adequate activity. The presence of adequate microbial cell numbers is not necessarily the case in which event the presence of oxygen and oxidizable chemical species will not necessarily result in the oxidation of such species and in an effective subsequent bioleaching process. The microbes required to catalyze the biological bioleaching reaction either have to be supplied in sufficient concentration or cultivated in-situ to achieve sufficient cell concentrations in the heap. Such in-situ cultivation requires, amongst other compounds, an adequate carbon supply.

Apart from the general problem that an inadequate supply of carbon dioxide may be growth-limiting (and thus heat generation limiting) a compounded problem exists in the 45° C.-60° C. temperature range. Although microbial strains capable of bioleaching are known to occur at all relevant temperature ranges, laboratory studies have indicated reduced microbial activity, both in terms of ferrous oxidation rates and sulphur oxidation rates, in the 45° C.-60° C. temperature range when compared to higher and lower temperature ranges. The reduced microbial activity is a function of temperature-dependent growth kinetics and is exacerbated by the fact that bacteria and archaea that are able to grow in this temperature range generally require elevated carbon dioxide concentrations, or the addition of organic carbon, in order to achieve optimal growth and sulphur oxidation rates. The practical impact of these factors has been determined in-situ from results obtained from a heap leaching simulation column of the type described in the specification of International patent application No. PCT/ZA2004/000025 (U.S. 2005/0136527). On three occasions (using different types of ore with 1.5%, 3% and 6% pyrite respectively) the simulation column reached an average temperature plateau at approximately 50° C. to 55° C. which corresponds to a region of lower microbial activity obtained from laboratory results and which occurs due to a reduced rate of microbial sulphur oxidation and thus heat generation. Unless this temperature plateau can be overcome, temperatures exceeding 50° C. cannot readily be achieved, thus precluding the achievement of significant copper recovery from ores that contain copper predominantly as chalcopyrite.

The heat generation in a bioleaching heap is dependent upon the oxidation of reduced sulphur species. The oxidation of such sulphur species generates most of the heat in the heap leaching context. The majority of such oxidation reactions, from reduced sulphur to sulphate, occur through microbial-mediation reactions. Oxygen is used as the electron acceptor in this process and, as a consequence of microbial growth using sulphur as a source of energy, not as a driver of microbial growth. The microbes utilize the energy derived from the oxidation of sulphur to fix carbon dioxide, ie. produce cellular metabolites, and thus to grow and proliferate. The sulphur oxidation rate is therefore governed by the rate at which microbes require energy (growth). The microbial growth rate, in turn, is critically dependent upon the most limiting factor for such growth. Such a limiting factor could be oxygen, carbon dioxide, energy (sulphur in this case) or other nutrients such as nitrogen etc. These relationships are graphically shown in FIG. 1.

Figure 2:
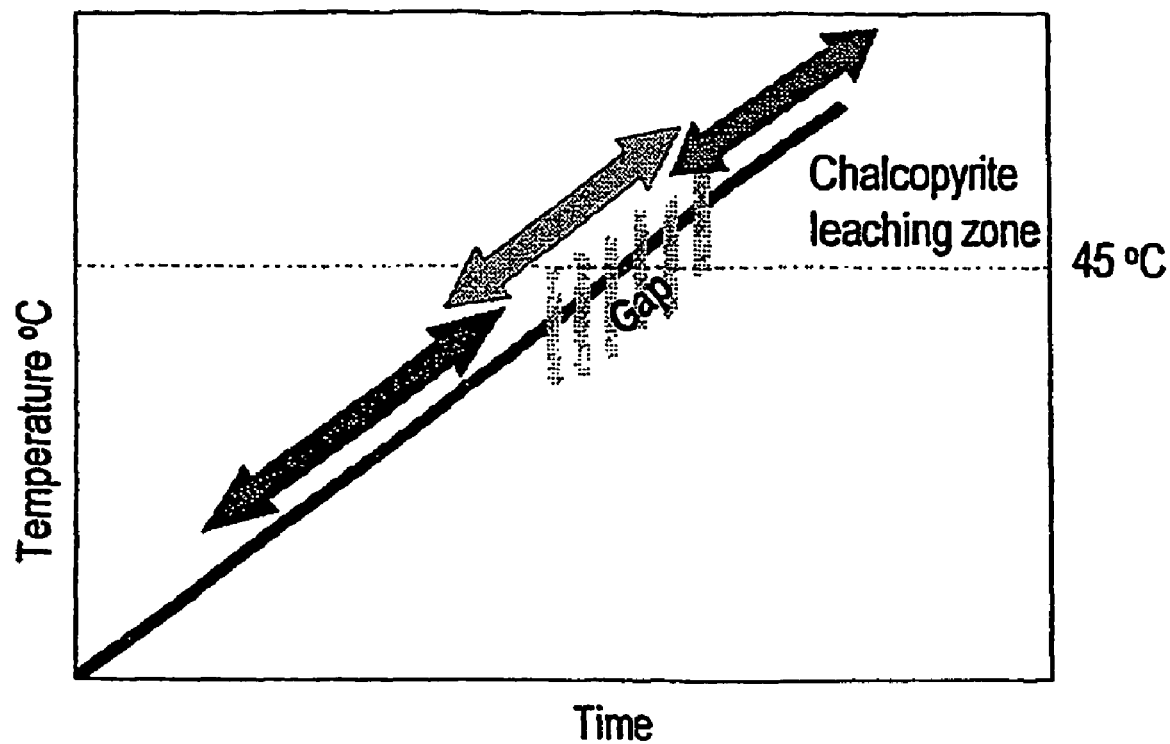
FIG. 2 schematically represents a principle upon which the invention is based.

FIG. 2 of the accompanying drawings is a graph of temperature versus time in a heap in which microbial mediated leaching takes place. The heap is initially inoculated with a mixed population which inter alia contains mesophile and moderate mesophile strains which can function in the temperature range of from ambient to about 45° C. using the carbon dioxide which is available from air flow through the heap. The air flow is controlled to ensure that the air flow rate is not so high that it exerts a cooling effect on the heap.

At about 45° C., as stated, microbial activity starts to be reduced and it is often not possible for the microorganisms to raise the temperature inside the heap across a temperature gap of from about 45° C. to 60° C. This is particularly problematic where the pyrite content (main source of sulphur, and thus heat) is less than 3% w/w. If the temperature of the heap can be raised to about 60° C. then thermophile microorganisms in the microbial population inoculated into the heap are usually capable of continuing the leaching process at these elevated temperatures using carbon dioxide from the normal air flow through the heap.

It is possible to address the reduced microbial growth rate in the aforementioned temperature gap by the blanket addition (ie. independently of the temperature in the heap) of carbon dioxide or a different carbon source which can be utilised by bioleaching bacteria and archaea. This however would incur high heap leaching operating costs, or cause potential inhibitory effects (in the case of organic carbon) to mesophilic bioleaching bacteria.

In the 45° C. to 60° C. range the limitation is not primarily due to carbon dioxide limitation but rather inherently slower kinetic growth rate constraints of the microbes that operate in this range. This problem can still however be overcome by carbon supplementation, particularly in the form of organic carbon (yeast extract for example), so as to enhance the activity of such microbes. So although the reasons for slower growth rates at temperatures below 45° C. and at temperatures in the range of 45° C. to 60° C. are different, both problems can, at least to some extent, be overcome by carbon addition.

Figure 3:
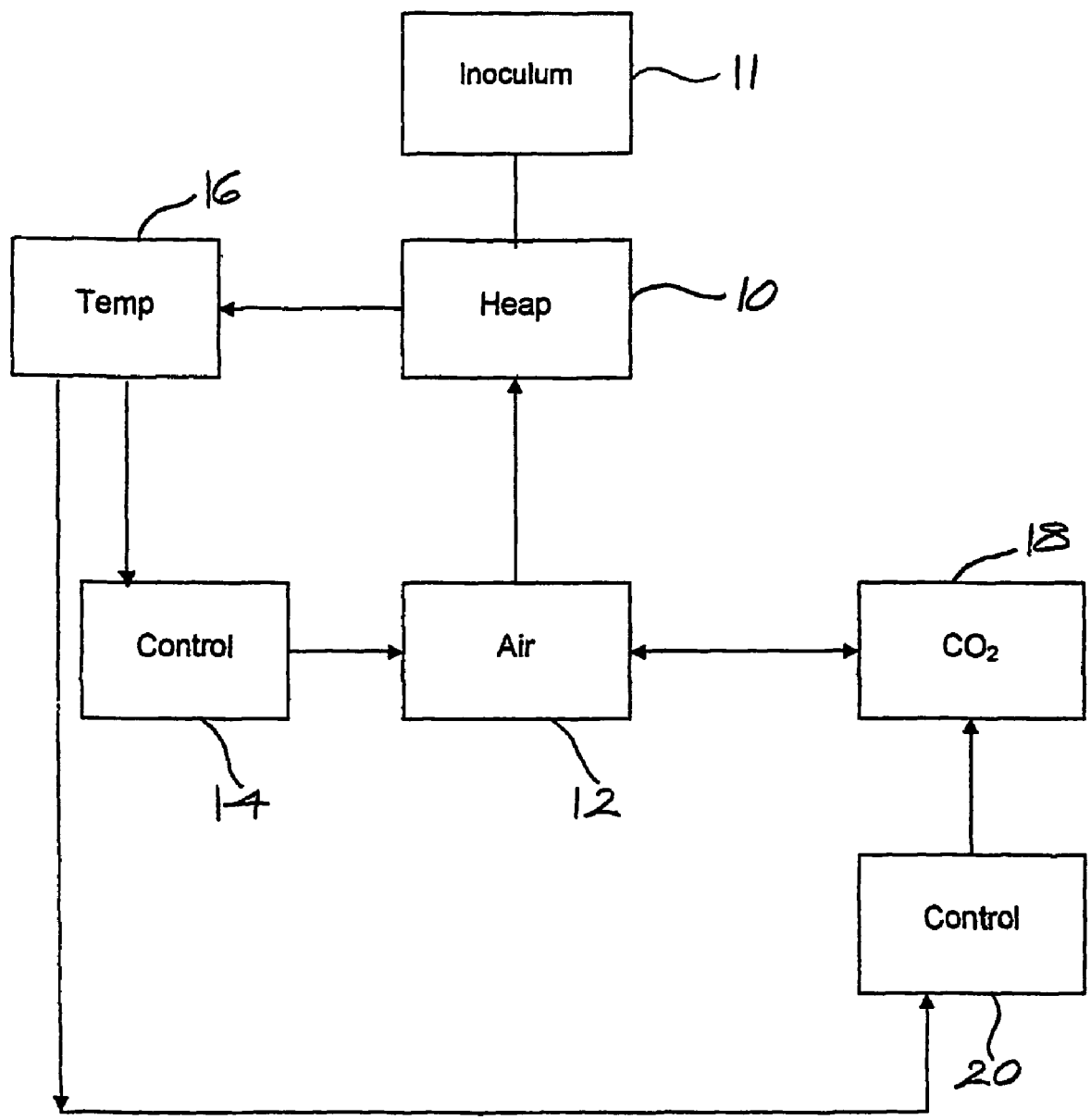
FIG. 3 is a block diagram representation of the manner in which the method of the invention is implemented.

FIG. 3 of the accompanying drawings schematically represents the manner in which the method of the invention is implemented. A heap 10 which normally would contain a low grade marginal copper ore with a refractory primary sulphide, eg. chalcopyrite, is inoculated using conventional techniques with a mixed microbial population 11. Without being limiting this population could include species from the following archaeal and bacterial genus groups for each temperature category:

ambient—45° C.: *Acidithiobacillus, Leptospirillum, Thiobacillus, Acidimicrobium, Sulfobacillus, Ferroplasma* (Ferriplasma), *Ferfimicrobium, Acidiphilum, Alicyclobacillus;*

45° C.-60° C.: *Acidithiobacillus, Thiobacillus, Acidimicrobium, Sulfobacillus, Ferroplasma* (Ferriplasma), *Thermoplasma, Alicyclobacillus, Ferrimicrobium;* and >60° C.: *Sulfolobus, Acidianus, Metallosphaera, Ferroplasma* (Ferriplasma), *Thermoplasma.*

Air 12 drawn from the atmosphere is supplied to the heap at a rate which is controlled by a control mechanism 14. As has been described hereinbefore the air contains sufficient carbon dioxide to enable the microbial strains in the heap to function effectively in terms of ferrous oxidation rates and sulphur oxidation rates, up to a temperature of about 45° C.

The rate at which the air 12 is supplied is manipulated to ensure that the carbon requirements of the microbial population are met without the air exerting a significant cooling effect on the heap.

At a predetermined temperature in the heap, schematically represented by a block 16, which normally is of the order of 45° C., the step of adding carbon (in the form of carbon dioxide) to the heap is distinguished from the heat manipulation step and is substantially independently implemented. In other words the air flow rate is not used for simultaneous controlling the addition of carbon and for regulating the temperature of the heap. Above this temperature the air flow rate is controlled primarily to manipulate the temperature in the heap, ie. to prevent the air stream (although providing adequate oxygen to the microorganisms) from cooling the heap, and carbon from a suitable source 18 is supplied, preferably under the control of a suitable control device 20, to the heap to supplement the carbon in the air flow to a level which is adequate to enable the gap of low microbial activity to be crossed.

The invention thus provides for the targeted addition of carbon to the heap at the specific point in the heap leaching process when it is required ie. when carbon supply becomes limiting to microbial growth and thus to sulphur oxidation and heat generation.

In the method of the invention it is necessary to know the point at which the heat generation process stagnates ie. at which the temperature plateau or microbial activity gap, referred to in connection with FIG. 2, commences. The heap leaching simulation column described in the specification of International patent application No. PCT/ZA2004/000025 (U.S. 2005/0136527) provides a mechanism for the accurate detection of heat generation capacity in a heap leaching environment as a function of inoculation conditions, microbial growth kinetics, microbial population dynamics and other relevant heap operational factors which include ore type, particle distribution, gangue acid chemistry and mineralogy, copper mineral composition, pyrite content, air flow rate, irrigation flow rate, PLS chemistry etc. The data derived from the heap leaching simulation column facilitates the accurate detection of the point at which microbial catalyzed heat generation becomes limited and thereby allows for targeted carbon addition to overcome such limiting factors during heap leaching operation.

In addition to the heat generation data provided by the simulation column, carbon dioxide consumption data can also be obtained if the column is fitted with carbon dioxide monitoring equipment. Experimental data from such simulation studies have shown that declines in carbon dioxide consumption rates coincide with (or slightly precede) declining rates of heat generation, thereby providing further evidence that microbial growth rates (as indicated by carbon assimilation rates) are related to sulphur oxidation rates (heat generation). It should be noted, however, that carbon dioxide monitoring as an indicator of microbial growth is only valid in the absence of carbonate minerals in the ore material and in the absence of organic compounds being utilized as a carbon source by the bioleaching microorganisms.

Additional carbon can be added in the form of carbon dioxide, most likely supplemented into the air sparging system, or as organic carbon such as a yeast extract, most likely added into the heap irrigation system at the point at which heat generation rates become limiting (most likely, and typically, due to reduced growth kinetics and reduced carbon fixing capacity of moderate thermophile microorganisms in the range 45° C.-60° C.).

The carbon dioxide concentration could be added in the range of 0.03%- 5% depending on the air supply rates used and the carbon dioxide consumption rates per ton of ore. An organic carbon source, such as a yeast extract, could be added at a concentration in the range of 10-1000 mg $l^{-1}$ depending on heap conditions.

The addition of carbon addition could be continued for as long as required but generally would be discontinued when a temperature of 60° C. is reached. At this temperature thermophilic bioleaching archaea usually have a high carbon dioxide fixing capacity and are unlikely to require carbon in addition to that contained in air, although the benefit of carbon dioxide addition is not entirely excluded at temperatures exceeding 60° C.

As an alternative to using the simulation column to determine the temperature at which the temperature plateau exists, carbon addition could be commenced in the upper ranges of mesophilic temperatures (i.e. at approximately 40° C.). The addition of carbon in this temperature range where most of the bacteria have a high carbon fixing ability would be to compensate for the potential depletion of carbon dioxide delivered by the air flow to the heap. Such carbon addition would then continue up to the thermophilic temperature range. An additional advantage of carbon addition at 40° C. is that the cell concentration of mesophilic microorganisms would be increased. Although mesophilic microorganisms are typically relatively inactive at temperatures above 45° C., they do retain a low level of activity beyond this temperature. By increasing the number of mesophilic microorganisms the overall microbial activity, and thus heat generation capacity (via sulphur oxidation), at the lower moderate thermophilic temperatures (45° C.-55° C.) is enhanced. The mesophiles thus provide supplementary activity to the true moderate thermophile microorganisms in this temperature range.

In addition to the optimization of microbial growth and thus heat generation via carbon supplementation, other factors that affect microbial growth could also be implemented. These include:

(a) nutrient additions as known in the art (typically 10-50 mg $l^{-1}$) respectively of phosphate and ammonium;

(b) the elimination of acid damage to a microbial inoculum when using acid during inoculation at agglomeration. Such damage could occur in instances where acid is used during agglomeration at the time of inoculation. If the concentration of the acid used is too high relatively to the moisture content of the material, the cells experience acid damage effects which may selectively damage cells that could grow in a particular temperature range and this affects the smooth progression of microbial succession and heat generation;

(c) the elimination of high-pH damage during initial phases of heap start-up. The solution pH's of heap leaching operations are typically relatively high (in the range 2.5-4.5) because of gangue acid consumption effects. Some archaea are particularly prone to damage when exposed to pH values above 2 for prolonged periods of time. This may cause selective damage to cells that could grow in a particular temperature range and thus also affect the smooth progression of microbial succession and heat generation; and (d) the elimination of inhibitory inorganic compounds and organic compounds in the solution (typically raffinate) irrigated onto the heap. Specific inorganic compounds such as chloride, high total inorganic salt concentrations (typically >120 g $l^{-1}$), or organic compounds (at very low concentrations) derived from solvent extraction chemicals, may cause inhibition effects towards bioleaching microorganisms and thus adversely affect their heat generation ability.

The advantages of the method of the invention include the following:

(a) the targeted addition of carbon is more cost-effective than non-specific carbon addition and avoids secondary problems associated with non-targeted carbon addition;

(b) the targeted addition of carbon increases microbial growth rates, resulting in increased sulphur oxidation rates and thus increased heat generation, particularly in the 45° C.-60° C. temperature range;

(c) the temperature generation in a heap is likely to continue through and beyond the typically encountered 50° C. temperature plateau, thus facilitating conditions conducive to the growth of thermophile archaea (with temperature optima >60° C.) and rendering heap temperatures exceeding 65° C. more easily attainable; and (d) increased heap temperatures exceeding 50° C. result in improved overall total copper recovery and improved rates of recovery particularly from chalcopyrite in heap bioleaching environments.

The preceeding discussion treated the addition of carbon dioxide or organic carbon as interchangeable alternatives. In general terms any suitable carbon source, eg. carbonate-containing materials, can be used to supplement the carbon level in the heap. The addition of organic carbon in the form of yeast extract, for example, may provide additional advantages apart from the carbon and increased water solubility. Low cost organic carbon sources such as yeast extract or molasses may contain vitamins and other growth factors that contribute to enhanced microbial growth beyond that which would be contributed by the carbon contained in such organic carbon sources.

In a variation of the invention which is used in place of or together with the addition of carbon to cross the gap of reduced microbial activity, heat energy can be directly added to the heap in any suitable way. For example an irrigation solution applied to the heap can be heated by external means. It is also possible to heat the air flow which is supplied to the heap. Use may be made of solar heating for this purpose and, where appropriate, thermal insulation could be applied to the heap to reduce heat losses. Another possibility is to make use of any of the techniques described in the specification of International patent application No. PCT/ZA2001/00154 (U.S. Pat. No. 6,884,280) wherein, in general terms, heat generated in a tank leaching operation is used to raise the temperature of a bioleaching heap. This would be done, using the principles of the present invention, to enable the temperature gap in which reduced microbial activity takes place, to be bridged.

The invention claimed is:

1. A method of operating a microbial mediated ore heap leaching process comprising:
   providing a microbial population to the heap
   operating the heap in a manner such that a temperature in the heap is between about 45° C. to about 60° C.;
   determining a carbon supply limiting temperature which is defined as a temperature within the range of about 45° C. to about 60° C. at which carbon supply becomes limiting to microbial activity;
   adding organic carbon to the heap to raise the temperature in the heap to a temperature greater than the carbon supply limiting temperature when the temperature in the heap is at about the carbon supply limiting temperature.

2. A method according to claim 1 wherein the organic carbon is at least one of the following:
   (a) molasses; and
   (b) yeast, or a yeast extract.

3. A method according to claim 1 wherein the organic carbon is added at a concentration of 10-1000 mg $l^{-1}$.

4. A method according to claim 1 further comprising adding carbon by means of at least one of the following: by enriching the carbon dioxide content in an air stream supplied to the heap; and by adding carbonate-containing minerals to the heap.

5. A method according to claim 1 further comprising adding heat to the heap.

6. A method according to claim 5 wherein the heat is added by means of at least one of the following:
   (a) by heating an irrigation solution which is supplied to the heap;
   (b) by heating air which is supplied to the heap;
   (c) by solar heating the heap;
   (d) by applying thermal insulation to the heap to reduce heat losses; and
   (e) by adding heat which is generated in a tank leaching operation to the heap.

7. A method of operating a microbial mediated ore heap leaching process comprising:
   providing a microbial population to the heap
   operating the heap in a manner such that a temperature in the heap is between about 45° C. to about 60° C.;
   determining a carbon supply limiting temperature which is defined as a temperature within the range of about 45° C. to about 60° C. at which carbon supply becomes limiting to microbial activity;
   adding heat to the heap to raise the temperature in the heap to a temperature greater than the carbon supply limiting temperature when the temperature in the heap is at about the carbon supply limiting temperature wherein the heat is added by means of at least one of the following:
   (a) by heating an irrigation solution which is supplied to the heap;
   (b) by heating air which is supplied to the heap;
   (c) by solar heating the heap;
   (d) by applying thermal insulation to the heap to reduce heat losses; and
   (e) by adding heat which is generated in a tank leaching operation to the heap.

8. A method according to claim 7 further comprising adding carbon to the heap.

9. A method according to claim 8 wherein the carbon is added by means of at least one of the following: by enriching the carbon dioxide content in an air stream supplied to the heap; by adding carbonate-containing minerals to the heap; and by adding organic carbon to the heap.

10. A method according to claim 9 wherein the organic carbon is at least one of the following: molasses; and yeast, or a yeast extract.

11. A method according to claim 9 wherein the organic carbon is added at a concentration of 10-1000 mg $l^{-1}$.

12. A method of operating a microbial mediated ore heap leaching process comprising:
    providing a microbial population to the heap
    operating the heap in a manner such that a temperature in the heap is between about 45° C. to about 60° C.;
    determining a carbon supply limiting temperature which is defined as a temperature within the range of about 45° C. to about 60° C. at which carbon supply becomes limiting to microbial activity;
    adding heat to the heap from a source external to the heap to raise the temperature in the heap to a temperature greater than the carbon supply limiting temperature when the temperature in the heap is at about the carbon supply limiting temperature.

13. A method according to claim 12 wherein the heat is added by means of at least one of the following:
    (a) by heating an irrigation solution which is supplied to the heap;
    (b) by heating air which is supplied to the heap;
    (c) by solar heating the heap;
    (d) by applying thermal insulation to the heap to reduce heat losses; and
    (e) by adding heat which is generated in a tank leaching operation to the heap.

14. A method according to claim 12 further comprising adding carbon to the heap.

15. A method according to claim 13 wherein the carbon is added by means of at least one of the following: by enriching the carbon dioxide content in an air stream supplied to the heap; by adding carbonate-containing minerals to the heap; and by adding organic carbon to the heap.

16. A method according to claim 14 wherein the organic carbon is at least one of the following: molasses; and yeast, or a yeast extract.

17. A method according to claim 15 wherein the organic carbon is added at a concentration of 10-1000 mg $l^{-1}$.

18. A method of operating a microbial mediated ore heap leaching process comprising:
    providing a microbial population to the heap
    operating the heap in a manner such that a temperature in the heap is between about 45° C. to about 60° C.;
    determining a carbon supply limiting temperature which is defined as a temperature within the range of about 45° C. to about 60° C. at which carbon supply becomes limiting to microbial activity, wherein the carbon supply limiting temperature is determined using a sample of the ore in a heap leaching simulation column separate from the heap;
    changing at least one heap operating parameter to raise the temperature in the heap to a temperature greater than the carbon supply limiting temperature when the temperature in the heap is at about the carbon supply limiting temperature.

19. A method according to claim 18 wherein the step of changing the at least one operating parameter is stopped when the temperature in the heap is above 65° C.

20. A method according to claim 18 wherein the step of changing the at least one operating parameter is carried out while the temperature in the heap is in the range of 45° C. to 60° C.

21. A method according to claim 18 wherein, at a heap temperature which is in the range of 45° C. to 60° C., air flow to the heap is controlled so that the air flow does not cool the heap and carbon is added to the heap to enhance the activity of microbes that operate in this temperature range.

22. A method according to claim 18 wherein, at a temperature below 45° C., the air flow rate to the heap is used for simultaneously controlling the addition of carbon to the heap, and for regulating the temperature of the heap.

23. A method according to claim 18 wherein the at least one operating parameter is changed by means of at least one of the following: adding carbon to the heap; and adding heat to the heap.

24. A method according to claim 23 wherein the carbon is added by means of at least one of the following:
   (a) by enriching the carbon dioxide content in an air stream supplied to the heap;
   (b) by adding carbonate-containing minerals to the heap; and
   (c) by adding organic carbon to the heap.

25. A method according to claim 24 wherein the organic carbon is at least one of the following: molasses; and yeast, or a yeast extract.

26. A method according to claim 25 wherein the organic carbon is added at a concentration of 10-1000 mg $l^{-1}$.

27. A method according to claim 23 wherein the heat is added by means of at least one of the following:
   (a) by heating an irrigation solution which is supplied to the heap;
   (b) by heating air which is supplied to the heap;
   (c) by solar heating the heap;
   (d) by applying thermal insulation to the heap to reduce heat losses; and
   (e) by adding heat which is generated in a tank leaching operation to the heap.

28. A method of operating a microbial mediated ore heap leaching process comprising:
   providing a microbial population to the heap
   operating the heap in a manner such that a temperature in the heap is between about 45° C. to about 60° C.;
   determining a carbon supply limiting temperature which is defined as a temperature within the range of about 45° C. to about 60° C. at which carbon supply becomes limiting to microbial activity;
   adding carbon to the heap and heat external to the heap from a source external to the heap to raise the temperature in the heap to a temperature greater than the carbon supply limiting temperature when the temperature in the heap is about the carbon supply limiting temperature.

29. The method according to claim 28 wherein the carbon is added independently of the heat.

* * * * *